(12) United States Patent
Tanner et al.

(10) Patent No.: US 7,509,400 B1
(45) Date of Patent: Mar. 24, 2009

(54) METHOD AND SYSTEM FOR INTERACTIVELY CONFIGURING A NETWORK DEVICE

(75) Inventors: David Tanner, Saratoga, CA (US); Christopher Norris, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 745 days.

(21) Appl. No.: 10/723,120

(22) Filed: Nov. 25, 2003

(51) Int. Cl.
*G06F 13/00* (2006.01)

(52) U.S. Cl. .................. 709/220; 709/221; 709/222; 709/224; 345/221; 345/222; 370/352

(58) Field of Classification Search ......... 709/220–224; 707/1–10; 705/21
See application file for complete search history.

(56) References Cited

U.S. PATENT DOCUMENTS

| | | | |
|---|---|---|---|
| 6,009,466 A | 12/1999 | Axberg et al. ............... 709/220 |
| 7,114,001 B2 * | 9/2006 | Dettinger .................... 709/232 |
| 2002/0054169 A1 * | 5/2002 | Richardson ................. 345/854 |
| 2002/0156880 A1 * | 10/2002 | Mokuya ..................... 709/223 |
| 2002/0174209 A1 * | 11/2002 | Sesek et al. ................. 709/223 |
| 2003/0037040 A1 * | 2/2003 | Beadles et al. ................ 707/1 |

* cited by examiner

*Primary Examiner*—Jude J Jean Gilles
(74) *Attorney, Agent, or Firm*—Stolowitz Ford Cowger LLP

(57) ABSTRACT

A method and system for interactively configuring a network device is disclosed. A computer based method interactively configures a network device such as a router. A document is displayed a to a user of a client computer, which is coupled to the network device via a network. The document contains a configuration for the network device in a text format. The user edits the document to make a change in the configuration of the network device. The change in the configuration is sent to the network device. The change can be sent without sending the entire configuration.

39 Claims, 12 Drawing Sheets

METHOD AND SYSTEM FOR INTERACTIVELY CONFIGURING A NETWORK DEVICE

TECHNICAL FIELD

Embodiments of the present invention relate to the field of device configuration. More specifically, embodiments of the present invention relate to a method and system for interactively configuring a device.

BACKGROUND

Modern networks provide great advantages by allowing computers and other communicating entities to exchange information. Networks can comprise a number of component devices. Such network devices can include routers, switches, and other components. Such devices are typically programmable for setting their operating characteristics and controllable for changing these characteristics as well as for eliciting certain operations or functions.

Conventionally, device configuration is performed using command line interface (CLI), a graphical user interface (GUI), or by directly copying a configuration file to a device. For instance, to configure a router, a configuring entity can enter CLI, line by line, to the router. Using a GUI, the configuring entity can enter the commands for configuring the router by inputting entries graphically.

Such graphical inputs can include entry of text into graphical component fields, and/or using other graphically displayed computer based mechanisms. Conventional text editors, in contrast, copy a configuration file off the network device, allow the user to edit it, and then allow the edited file to be copied back to the device. The configuration file is typically copied in its entirety. Similarly, upon editing, the edited file is sent back to the network device in its entirety.

Using CLI to configure devices offers a number of convenient features, such as automatic command identifier completion and automatic display of available commands. For instance, using a keyboard to enter CLI information, after initially typing the first few letters of a command name or other identifier, a configuring entity user can simply depress the 'tab' key, and the CLI will automatically complete the display and entry of a corresponding command.

Another example of a convenience accorded to an entity using CLI to configure a device is the automatic display of commands. For instance, to display a list of all available and/or allowable commands at any given point in a configuration activity, a user can simply simultaneously depress the 'shift' and question mark/forward slash ('?' and '/') key. Such conveniences are available to configuring entities, such as network engineers and administrators.

However, configuring devices using CLI is typically a process involving multiple steps. Also, changing the configuration of a device using CLI is performed, for example, by a manual keyboard, by which commands are entered on a line by line basis. Where the configuration being changed is large and/or complex, line by line changes can be tedious, time consuming, and/or possibly error-prone. There is also no easy way to see what configuration has been changed in an editing session.

Further, the alternative of copying an entire configuration to the network device to change a device configuration can be time consuming and error-prone as well as consuming computing (e.g., processing) and networking resources and rendering the device unavailable during the configuration change. For instance, consider a typical router configuration comprising several hundred thousand separate data objects wherein to effectively change the configuration as needed a single object is to be changed.

In this instance, the configuring entity establishes contact with the router via Telnet and logs on thereto. The configuration is then copied off the network device and modified. Upon completing the input for the configuration change, the old configuration is deleted, in its entirety, and the new configuration loaded. To load the new configuration, the router must be restarted, after a shutdown. The new configuration is loaded during the boot up of the router.

Besides the time and tedium that can characterize this approach, as well as the possibility of inadvertently inputting an error while completing the changes, this method takes the device off line, rendering it unavailable for use. Also, network resources are consumed by retrieving the entire existing configuration from the router and sending the newly changed configuration back to it. However, where only a single object is to change, this consumption can be somewhat inefficient.

During rebooting the router and loading the new configuration, more time and resources are consumed, and another opportunity for errors arises. Rebooting takes time, as does loading and parsing the entire corpus of the new configuration (not just the changed object). During this time, the router remains unavailable. The loading and parsing of the new configuration can consume significant computing (e.g., processing and memory) resources while they transpire.

Further, whenever a configuration is changed, especially when, such as in the instant example, it is changed in its entirety, some probability exists that errors, such as transcription errors, exceptions, and the like, can occur. Such errors can further disrupt operation of the device and consume even more time and resources to debug and correct. For instance, the boot process can fail, the configuration can fail to load, or if loaded, can cause the device to operate improperly, etc.

Where a GUI is used for configuring a network device in lieu of configuring using CLI, some of the issues discussed above affecting CLI configuring can be ameliorated to some extent. However, in using a conventional GUI in lieu of CLI to configure a device, helpful and desirable features of the CLI configuration technique may not be available. For instance, a conventional GUI does not make the automatic command completion, help, and syntax check features available. In addition, a GUI does not offer the user individual command flexibility or a single view of all configuration and associated hierarchy.

Conventional text editors used for configuring a device in lieu of configuring using CLI either do not support parser based features or require the CLI language of the network operating system (OS) be imported into the tool to provide such parsing features. Lacking parsing features can add tedium, difficulty, and/or increase the probability for error. Also, the application must be maintained to remain current with the version of the OS running on the device. These issues can also apply to GUIs.

Requiring import of the device CLI language and/or maintaining currency with the device's OS version add complexity to the tool and demand additional resources. Further, conventional text editors operate to configure devices by overwriting entire configurations or configlets. For instance, conventional text editors copy configuration files off the device and copy edited files back to the device, both in their entirety.

Further, conventional device-resident text editors that are used for such applications operate under constraints of memory, processing characteristics and OS of the device. Also, conventional device-resident text editors cannot easily be extended (e.g., as they are part of the OS). Further, conventional device-resident text editors can be hindered in interacting with other off-device software and/or in operating with other devices.

SUMMARY

A method and system for interactively configuring a network device is disclosed. A computer based method interactively configures a network device such as a router. A document is displayed a to a user of a client computer, which is coupled to the network device via a network. The document contains a configuration for the network device in a text format. The user edits the document to make a change in the configuration of the network device. The change in the configuration is sent to the network device. The change can be sent without sending the entire configuration. Alternatively, an entire configuration can be sent to the network device.

The document is displayed upon receiving the configuration from the network device, for instance, in response to a user request from the client computer. In one embodiment, editing the configuration is performed by the user changing the text comprising the document using an interactive device configuration editor running on the client computer, and can involve interacting with the network device, such as to send changes in the configuration and/or to retrieve code to provide automatic functional features.

Such automatic functional features can include automatically completing a command fragment entered into the text, retrieving a selectable list of commands appropriate for insertion at a particular text position, and/or requesting the network device to perform a syntax check to detect an error in the configuration and display the error in the document. In one embodiment, the interactive device configuration editor interacts with the network device by sending a first code component from the client computer to said network device, and then receiving a second code component from that device in response.

For sending the configuration change to the network device, a transport object containing code comprising the change is formed and disposed within a transport medium. The code can comprise a command, which can be rendered in Command Line Interface (CLI) format. In one embodiment, the transport medium comprises a serial line interface. In another embodiment, the transport medium comprises Telnet. In another embodiment, the transport medium comprises Secure Shell.

In one embodiment, the transport medium comprises an interface that substantially complies with Common Object Request Broker Architecture (CORBA). In the present embodiment, the transport object can be formed by embedding the code within a set of tags, which can comprise Extensible Markup Language (XML) markers.

A computer based system for interactively configuring a network device can perform the method described above. In one embodiment, such a system comprises a development environment application and a co-functional text editing tool for editing a configuration document. The system displays the document and allows the user to change the configuration by editing the document using a graphical user interface (GUI) or another user interface. Configuration changes are tracked, and can be highlighted and undone. A code generator functions with the user interface to generate code corresponding to the change. A communication module functions with the code generator to send the change to the network device, and can include an error handler. In one embodiment, a computer usable medium containing program code can cause a computer system to perform the method described above.

DETAILED DESCRIPTION

Figure 1:
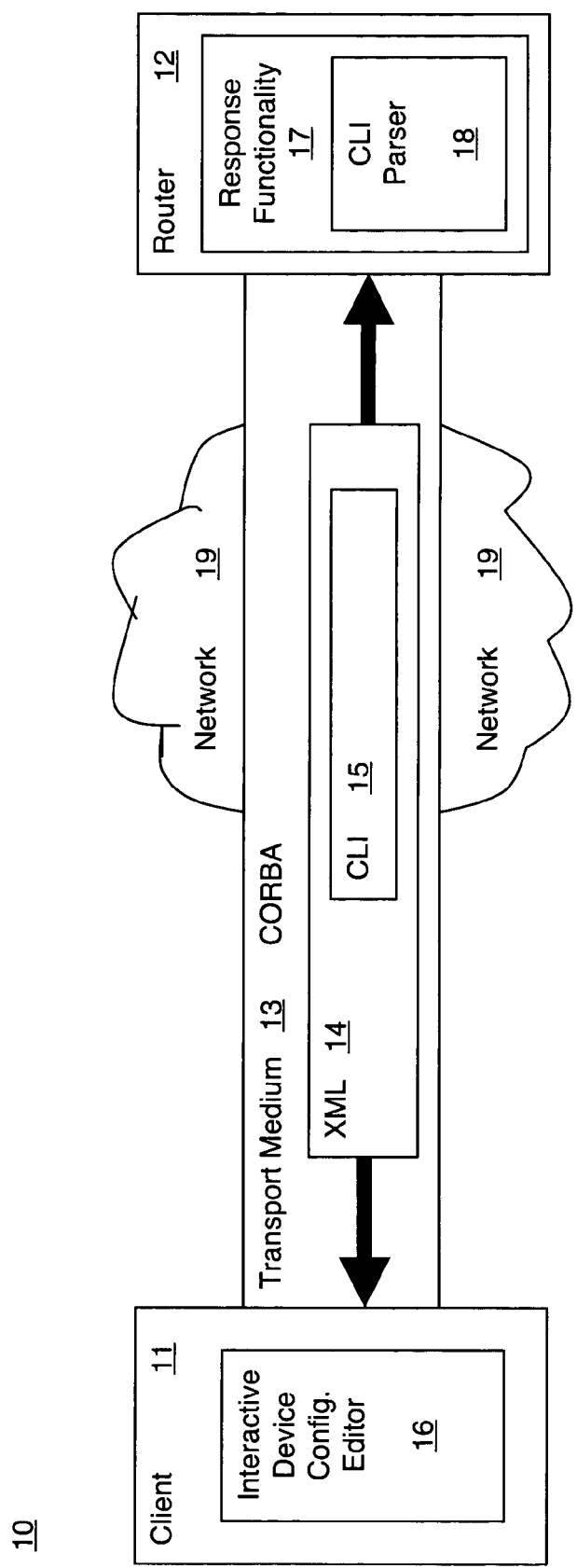
FIG. 1 depicts an exemplary interconnection between a configurable device and a computer based interactive device configuration editor, according to one embodiment of the present invention.

A method and system for interactively configuring a device is disclosed. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of embodiments of the present invention, numerous specific details are set forth in order to provide a thorough understanding of the present invention. In other instances, well known components, circuits, methods, materials, and procedures have not been described in detail so as not to unnecessarily obscure aspects of the present invention. Embodiments of the present invention are discussed primarily in the context of a method and system for interactively configuring a device.

Certain portions of the detailed descriptions of embodiments of the invention, which follow, are presented in terms of processes and methods (e.g., processes 40, 50, 60, 700, 80,

90, 100, and 1100 of FIGS. 4-12, respectively). Although specific steps are disclosed herein describing the operations of these processes and methods, such steps are exemplary. That is, embodiments of the present invention are well suited to performing various other steps or variations of the steps and/or sequences of steps recited in the flowcharts of the figures herein.

In one embodiment, such processes are carried out by processors and electrical/electronic components under the control of computer readable and computer executable instructions comprising code contained in a computer usable medium. The computer readable and computer executable instructions reside, for example, in code within a computer usable medium and used in the processor, data storage features, memory, registers and other components of a computer system performing the method for interactively configuring a device. However, the computer readable and computer executable instructions may reside in any type of computer readable medium.

A computer system that embodies a system and performs a method for interactively configuring a device can comprise any kind of computer system with sufficient computing power and memory capacity. For example, the computer system can comprise a specialized network control computer system, a client computer system, a specialized telecommunications control computer system, a workstation computer system, a personal computer system, a specialized device configuring computing system, a main-frame computer system, or a supercomputer system. Modules of the system for interactively configuring a device can be implemented in software, firmware, and/or hardware or any combination of software, firmware, and/or hardware.

A method and system for interactively configuring a network device is disclosed. A computer based method interactively configures a network device such as a router. A document is displayed a to a user of a client computer, which is coupled to the network device via a network. The document contains a configuration for the network device in a text format. The user edits the document to make a change in the configuration of the network device. The change in the configuration is sent to the network device. The change can be sent without sending the entire configuration. Alternatively, an entire configuration can be sent to the network device.

Therefore, only the minimal amount of code needed to effectuate a configuration change is sent to the device during an editing session. Thus, the consumptive utilization of network and computing resources and opportunity for introduction of inadvertent errors that can occur with conventional approaches to device configuration, wherein entire configurations must be transported to effectuate even small changes, can be ameliorated. An embodiment of the present invention can also edit a device configuration without having to reboot the device (e.g., until time to actually apply the configuration to the device). The present embodiment can thus operate more efficiently, perhaps saving time, as compared to conventional approaches. Further, since rebooting is not needed for editing the configuration, the present embodiment impacts the availability of the device being configured and offers less opportunity for introduction of errors than conventional approaches.

Exemplary Environment

FIG. 1 depicts an exemplary environment 10 wherein a configurable device 12 and a interactive device configuration editor 16 are interconnected, according to one embodiment of the present invention. Interactive device configuration editor 16 is deployed as an application upon a base client computer 11. Interactive device configuration editor 16 can be operated to configure any type of configurable device. In the depicted embodiment, device 12 comprises a router.

Interactive device configuration editor 16, based on client computer 11, exchanges data with device 12 using a transport medium 13. It is appreciated that transport medium 13 allows data exchange between device 12 and interactive device configuration editor 16 by modalities that can utilize physical elements and structures, such as modems, telephone lines and other components of a telephone system, wireless communications systems, and the like.

In one embodiment, such physical elements interconnect interactive device configuration editor 16 and device 12 through a network 19. So as not to obscure aspects of embodiments of the present invention, physical elements associated with transport medium 13 are not discussed further herein. Device 12 can thus comprise a network device, which can be a component of network 19. Network 19 can be a wide area network (WAN), the Internet, or another communications network.

In one embodiment, transport medium (e.g., interface) 13 complies substantially with the Common Object Request Broker Architecture (CORBA). This embodiment thus effectuates communication between distributed objects and other self-contained software modules. Further, the present embodiment provides for executing programs and other objects, which can be written in different programming languages and run on different platforms (e.g., on client 11 and/or on device 12).

Device 12 comprises a response functionality 17 that allows device 12 to interactively respond to interactive device configuration editor 16. Device 12 is programmed (e.g., configured) to operate so as to perform various actions in different situations, under different conditions, and to respond in other certain ways. The program controlling the operation of device 12 comprises its configuration. Network devices such as router 12 can comprise command driven systems.

The configuration of network device 12 thus comprises a set of commands expressible through a Command Line Interface (CLI) format. Response functionality 17 includes a CLI parser 18. Interactive device configuration editor 16 comprises an application that combines advantages of random access editing of the entire configuration of device 12 with desirable CLI features, such as provided through interactive communication with device 12, e.g., during a configuration editing session.

The interactive communication allowing random access editing of the entire configuration of device 12 with desirable CLI features is supported by transport medium 13. In one embodiment, a CORBA transport medium 13 embeds the CLI code 15 within extensible code 14, comprising a language such as Extensible Markup Language (XML). In one embodiment, the interface 13 comprises another transport medium.

Interface 13 can comprise any transport medium that provides appropriate application program interface (API). For instance, Telnet, Serial Line Interface (SLI), and Secure Shell (SSh), and others can all function as interface 13, as can a medium substantially compliant with CORBA. Although it is thus appreciated that embodiments of the present invention can be supported by various transport media and as such are independent of a particular transport medium, their operation are explained herein by reference to an embodiment wherein interface 13 comprises a CORBA transport medium.

Exemplary Data Structure

Figure 2:
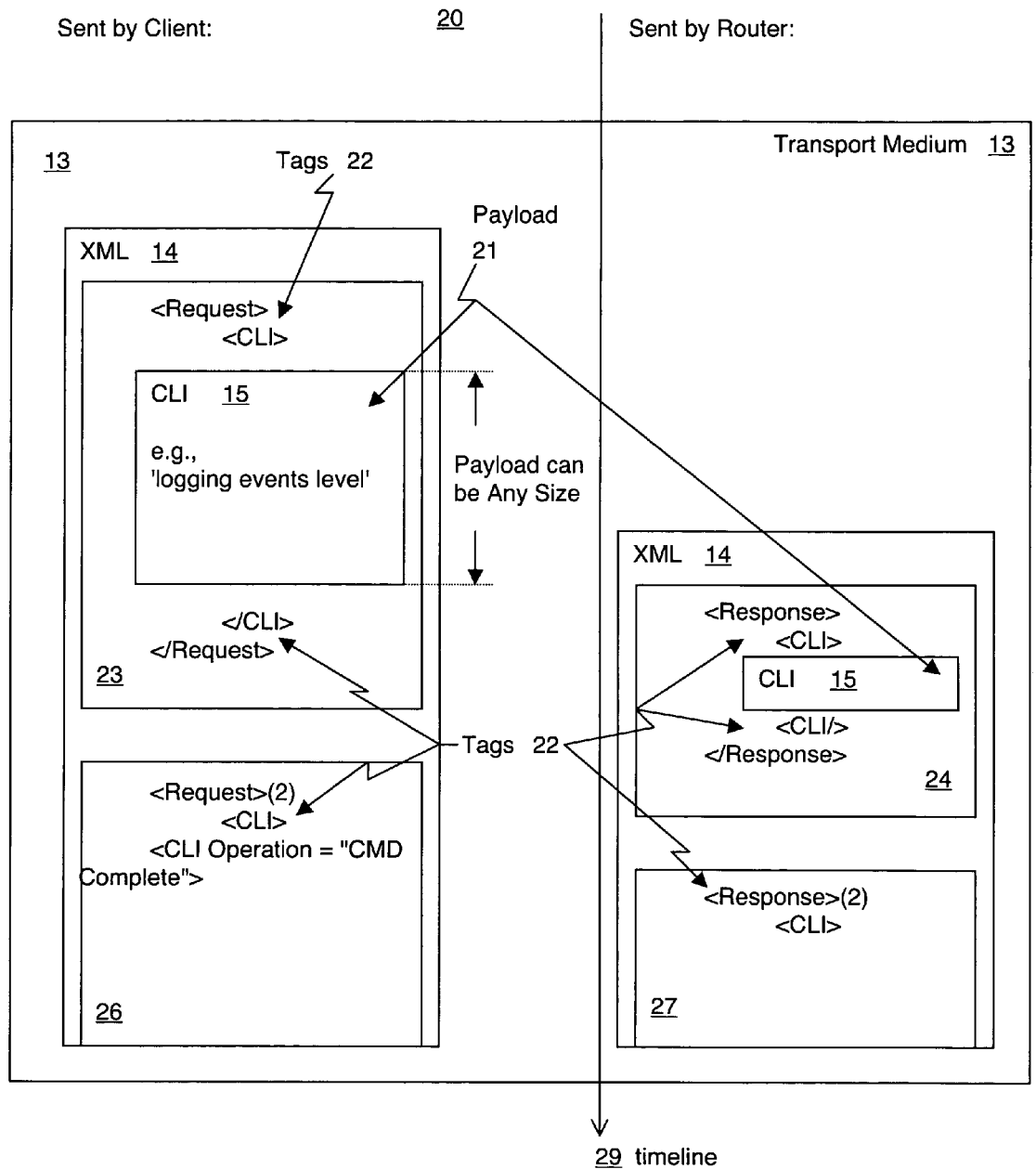
FIG. 2 depicts an exemplary interaction between a configurable device and a computer based interactive device configuration editor, according to one embodiment of the present invention.

The combination of the random access editing of an entire configuration of device 12 with desirable CLI features is provided by interactive device configuration editor 16 through interactive communication with device 12, such as during a configuration editing session. For instance, FIG. 2 depicts an exemplary interaction 20 between a configurable device and a computer based interactive device configuration editor, according to one embodiment of the present invention.

In the present embodiment, interaction 20 takes place via CORBA transport medium 13 and comprises the exchange of data structures 14 between an interactive device configuration editor based on client computer and a remote network device such as a router (e.g., as depicted in FIG. 1). Data structures 14 comprise two fields. A first field comprises a tag 22 in an extensible language such as XML. A second field, payload 21 comprises one or more CLI commands or CLI responses 15.

Interaction 20 can take place in real time, as shown by exemplary relative timeline 29. The interactive device configuration editor sends to the network device a first request 23. Transport medium 13 passes the data structure 14, and then a response functionality at the remote device decodes the XML and extracts the payload 21. A CLI parser of the response functionality parses the CLI command 15.

Responsive to the CLI command, the device sends a CLI response payload 21 within its XML data structure 14 as a response 24. Similarly, a second request 26 is sent by the interactive device configuration editor. Responsively, a corresponding request 27 is sent by the router or other remote network device. The relative timing of the requests and responses depicted herein by timeline 29 is exemplary.

Payload 15 can comprise a configuration change, or a command (or response) of any size. However, in one embodiment, the interactive device configuration editor sends to the device only the minimum amount of code necessary to convey to the device the configuration change. Advantageously, sending only the minimum amount of code necessary to send the configuration change economizes on the use of transport medium 13, and on the network and computing resources required to transport and process the code.

Exemplary Interactive Device Configuration System

Figure 3A:
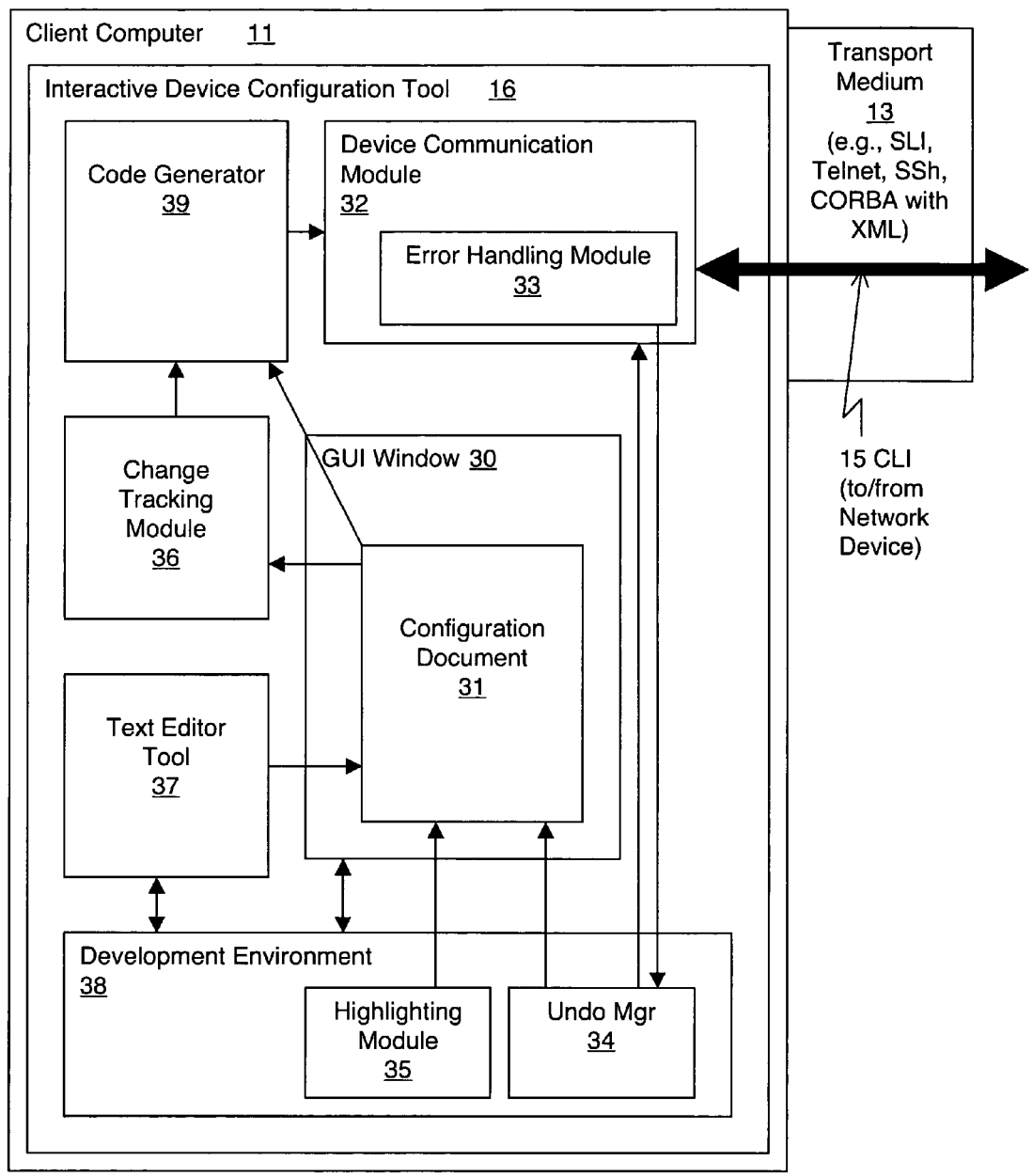
FIG. 3A depicts an exemplary interactive device configuration editor, according to one embodiment of the present invention.

FIG. 3A depicts an exemplary computer based system 16, for interactively configuring a network device. In one embodiment, system 16 comprises a computer based programming tool that functions to interactively configure a network device, such as a router.

Interactive device configuration tool 16 includes a component, such as a software application, for providing a development environment 38. A text editing component 37 functions development environment 38 to editing a configuration document 31. Document 31 includes text that comprises code for a configuration applicable to a network device.

A user interface, such as a graphical user interface (GUI) Window 30, functions with the development environment 38 and the text editor tool 37. GUI Window 30 displays document 31 to a user and allows the user to make a change thereto. A code generating component 39 functions with user interface 30 to generate code corresponding to the change in document 31. Such code can comprise a command, which can be rendered in CLI format.

A device communication module 32 functions with the code generator 39 to send the change (e.g., or changes) made by the user to the network device, such as by forming a transport object 15 comprising the change and disposing the transport object 15 in a transport medium 13. In one embodiment, the transport medium 13 comprises a serial line interface (SLI). In another embodiment, the transport medium 13 comprises Telnet. In yet another embodiment, the transport medium 13 comprises Secure Shell (SSh).

Embodiments of the present invention are well suited to function with a variety of different transport media 13. In one embodiment, the transport medium 13 comprises an interface that complies substantially with the Common Object Request Broker Architecture (CORBA). In one such embodiment, the transport object embeds the CLI (e.g., or other) code corresponding to the change within a set of XML tags.

In one embodiment, the computer based interactive device configuration tool 16 includes an error handling module 33. Error handling module 33 functions with the device communication module 32 to detect and handle an error in the code corresponding to the change in document 31.

In one embodiment, the computer based interactive device configuration tool 16 includes an a change tracking module 36, which functions with user interface 30 for tracking the change (e.g., or changes) made to document 31.

In one embodiment, the development environment 38 includes a highlighting module 35, for selecting a part of document 31 upon which to implement the change, and for indicating to the user which parts of document 31 they have edited.

In one embodiment, the development environment 38 includes an undo manager module 34, for restoring document 31 to a condition prior to implementing a change, such as to cancel (e.g., undo) the change.

The configuration comprising document 31 can be retrieved from a network device in response to a user request. Alternatively, document 31 can be written by a user "from scratch" (e.g., written from an originally blank state). For instance, the user can work on a new configuration written from scratch, on a locally stored configuration, or on a configuration retrieved from a network device different from the device to which the interactive configuration editor 16 is connected. In the present embodiment, interactive configuration editor 16 provides the user working on the local configuration with the option of specifying a device to interact with, for those editing actions that result in device interactions. Changes to document 31 are made by interaction with the network device.

In one embodiment, the change is made to document 31 interactively with the network device by a process wherein a first code component is sent from device communication module 32 to the network device and receiving a second code component from the network device in response to sending the first code component. Advantageously, this allows convenient CLI-based features, such as automatic command completion, 'Help' functions, and syntax checks to be used with the interactive device configuration tool 16.

For instance, to initiate automatic completion of a CLI command by the network device, a user request comprises entering a fragment of text (e.g., that includes the first few letters of the command name) into the document and depressing the 'Tab' key or making a menu selection, to initiate an automatic completion of the command. Here, the first code component comprises the textual fragment of said command. The second code component, sent responsively to the user request, comprises the corresponding complete command, in its entirety, which is added to the text of document. The complete command is added to document 31 at the current position of a cursor (e.g., where the command fragment was entered by the user upon initiating the request).

Upon triggering of a command completion request, the minimal set of code necessary to provide (e.g., establish) the appropriate submode context for the incomplete command is generated by interactive configuration editor 16 and provided (e.g., via transport medium 13) to the network device. In one embodiment, this minimal CLI command generation is performed by code generator 39.

Responsive to receiving the minimal set of CLI commands necessary to establish the appropriate submode context for the incomplete command, the network device returns the completion (if any) to the interactive configuration editor 16 (e.g., via transport medium 13). Upon receiving the completion to the command, interactive configuration editor 16 incorporates the completion at the current cursor location (e.g., position within the text comprising document 31).

In generating CLI commands for command completion or for another interactive CLI feature, interactive configuration editor 16 automatically handles providing submodes to establish context. It is appreciated that even a relatively simple edit performed by interactive configuration editor 16, for example changing the name of an access list, can actually map to a significant number of CLI commands (e.g., some edits may map to hundreds, some to thousands of CLI commands).

Interacting with the network device, a 'Help' function can be initiated therefrom. For instance, at a current cursor position within text comprising document 31, the user can enter the 'Help' request by depressing a certain key (e.g., the '?' [question mark] key). The code corresponding to the 'Help' request comprises the first code component. Responsively, the second code component is returned to the interactive device configuration tool 16 by the network device. The responsive second code component comprises a list of commands that are appropriate to the current position in the text of document 31. The list is interactively displayed by GUI Window 30, so that the user may select a command from that list for insertion into document 31 at the current text position.

The set of help options can comprise, for instance, a set of all CLI commands applicable at the point in the text of document 31 at which a cursor is positioned. The 'help' options are displayed (e.g., on a monitor associated with host client computer 11) for a user to choose from. In one embodiment, the 'help' options are displayed in a floating selector dialog field. The user can select a particular 'help' option, for example by clicking on the option desired.

Upon its selection, the chosen 'help' option is substituted into the configuration at the point in the text of document 31 at which the cursor is positioned. The content comprising the chosen 'help' option thus replaces the text that was at the cursor position prior to the substitution. The 'Help' feature is applicable to a particular line of text within document 31. Some of the CLI features effectuated by interactive configuration editor 16 can apply to other than single text lines.

Interacting with the network device, a syntax check by the device can be initiated for document 31 or changes thereto from. For instance, where the user requests a syntax check, the first code component comprises the request for the syntax check. The second code component, returned by the device in response to the user request, comprises a detection of an error in document 31 (e.g., or an individual change thereto). Document 31 is updated to display the error.

For instance, syntax checking comprises one CLI feature that applies to an entire configuration, or to highlighted or otherwise selected portions of the text of document 31. A syntax check can be triggered by a user selecting a block of text comprising document 31 and requesting a syntax check by taking an action such as a key stroke, clicking a menu selection, etc. The user could also select the entire document upon which to run a syntax check.

A syntax check can also be initiated automatically upon a configuration such as that represented by document 31 by applying that configuration to the configurable device (e.g., via transport medium 13), for instance in its entirety. The device then responsively performs the syntax check on the configuration. Advantageously, where the configurable device is a router or another network device, the running configuration thereof is unaffected, allowing the device to continue to operate unaffected.

Upon triggering of a 'syntax check' request, interactive configuration editor 16 provides the minimal set of CLI commands necessary to transmit the syntax check request (e.g., in addition to the configuration to be checked). Responsive to receiving the minimal set of CLI commands for the 'syntax check' request, the device performs the syntax check for the transmitted CLI commands.

Device communication module 32 sends the change in document 31 to the network device without sending an unchanged component of the configuration to said network device (e.g., without sending the configuration in its entirety), thus conserving networking and computational resources. However, an entire configuration (e.g., a new configuration) can be sent to the network device if desired, such as to replace its installed configuration in its entirety.

Interactive text editor 16 also allows for portions of a configuration to be sent, for syntax checking and/or to edit an existing (e.g., installed and/or programmed) configuration thereon, or component lines thereof. Advantageously, the configurable device can remain on line during this process.

Upon applying a configuration to a configurable device, such as a router or another network device, the device responsively sends back details of any lines of configuration that are in error, for instance syntactically. Error handling module 33 then displays those errors in the context of corresponding commands that are erroneous. Error detection may also be used to cause undo manager 34 to trigger appropriate undo operations, as necessary. For example, CLI commands can be negated that have successfully been applied up to the point at which the error is encountered.

Through its interactive CLI features, configuration editor 16 remains immune to changes in the CLI command-set of the configurable device OS. For instance, interactive configuration editor 16 does not emulate or incorporate a replication of the CLI parser of the configurable device. Configuration editor 16 interactively goes to the configurable device to effectively have CLI related operations performed thereon. Thus, configuration editor 16 needs no change if the CLI command-set of the configurable device OS is modified.

Interactive configuration editor 16 can modify an individual object, advantageously without the need to overwrite an entire configuration. Interactive configuration editor 16 issues the appropriate commands to a configurable device (e.g., via transport medium 13) that are needed to make editorial or other changes that a user has called for, for instance, in the text comprising document 31. These commands include those that invoke error detection.

Commands that call for error detection can be sent when a configuration is applied to the configurable device. Where a user specifies (e.g., using GUI window 30) that either all of the changes are applied to the configurable device or none of them are applied (e.g., that the changes are "atomic"), error detection triggers appropriate 'Undo' operations. In one embodiment, error handling module 33 coordinates the 'Undo' operations with undo manager 34.

Interactive configuration editor 16 expands a single editing action made to document 31 into the one or more CLI commands that can complete the desired operation. Change tracking module 36 tracks changes as the configuration (e.g., document 31) is modified. A programmed algorithm is invoked, for instance by code generator 39, to generate only the set of CLI commands which can perform the changes logged by change tracking module 36.

Interactive configuration editor 16 sends only the minimal amount of CLI code needed. Where submodes are to establish context, in one embodiment this is handled by providing them programmatically. While a user performs editing, interactive configuration editor 16 does not send CLI line by line. In one embodiment, the editorial changes and other inputs are buffered and sent when the user takes an action to send them, such as initiating an 'Apply' command.

Figure 3B:
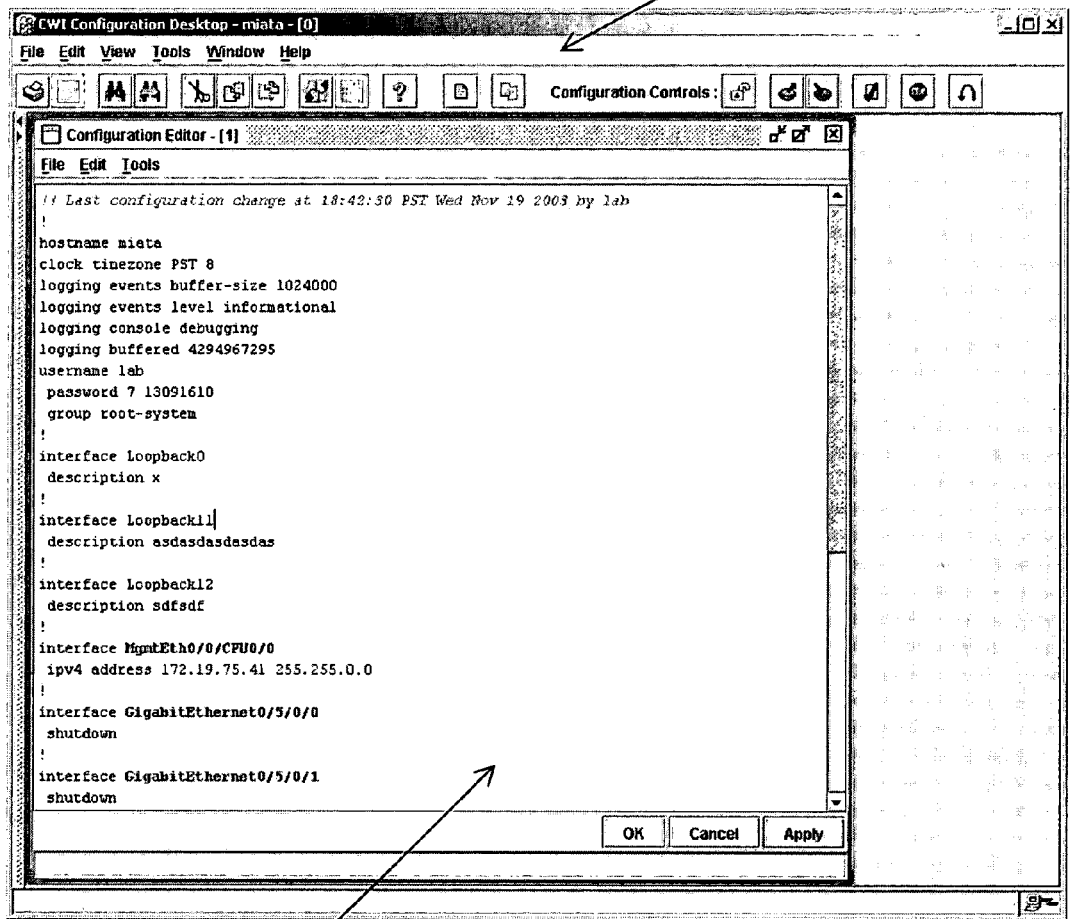
FIG. 3B depicts an exemplary screen shot of a graphical user interface (GUI) window of an interactive device configuration editor, according to one embodiment of the present invention.

FIG. 3B depicts an exemplary screen shot 300 of a GUI window 30 of an interactive device configuration editor, according to one embodiment of the present invention. Within window 30, a document 31 includes text corresponding to code comprising a configuration for a network device, such as a router. A user can interactively configure a network device by editing or otherwise changing the text of document 31.

CLI based features, such as automatic command completion and help, are provided by GUI window 30. In addition, window 30 provides to the user development environment features such as highlighting and text editor features, such as inline editing, copy/paste, and other such features.

Exemplary Computer Based Processes

In one embodiment, interactive configuration editor 16 performs a variety of functions through several computer based and implemented processes. Such processes are described in the following discussion as Processes 40, 50, 60, 700, 80, 90, and 100 of FIGS. 4-10, respectively. Although specific steps are disclosed herein describing the operations of these processes and methods, such steps are exemplary. That is, embodiments of the present invention are well suited to performing various other steps or variations of the steps and/or sequences of steps recited in the flowcharts of the figures herein.

Figure 4:
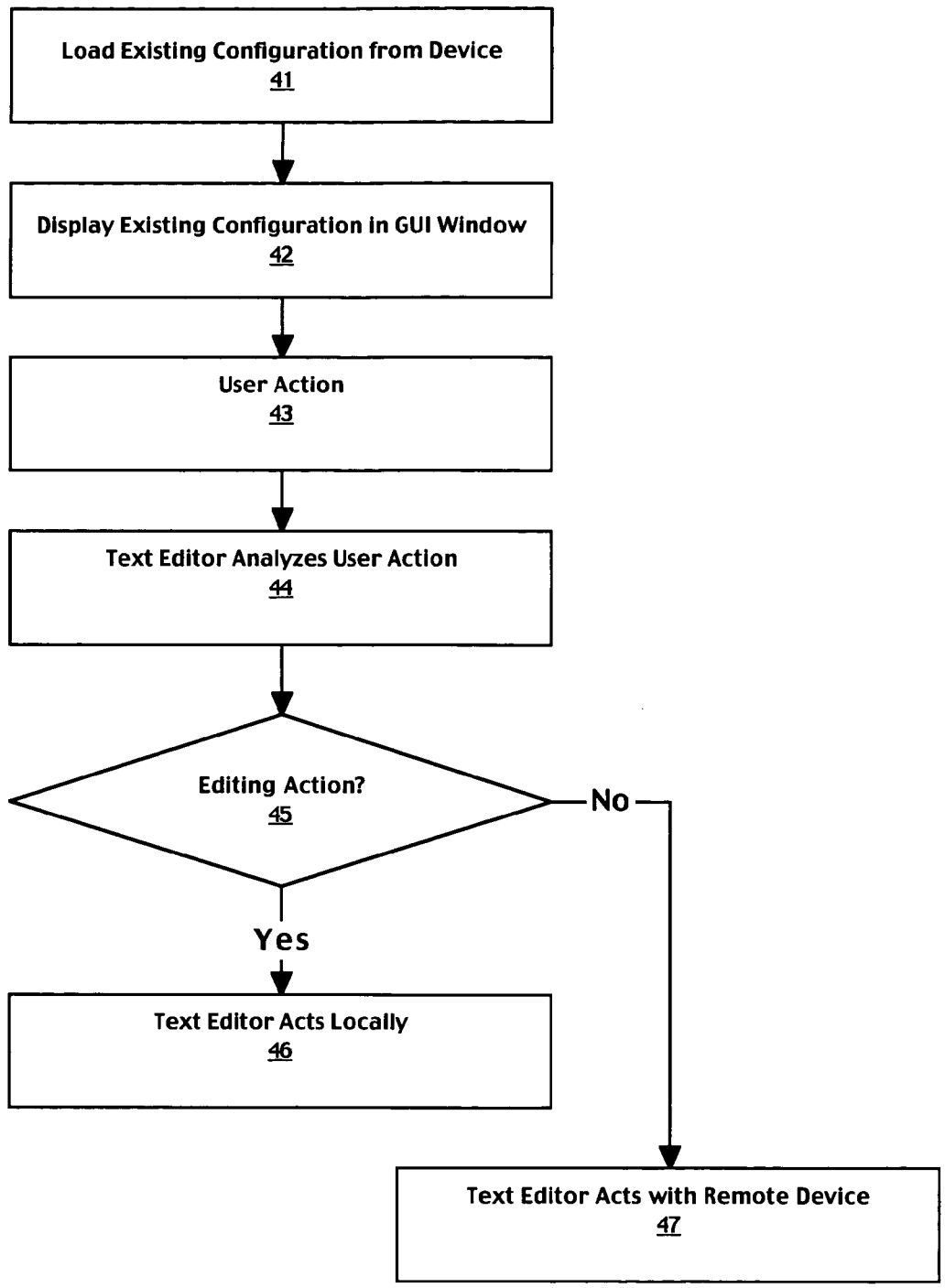
FIG. 4 is a flowchart of an exemplary process for some operations of an interactive device configuration editor, according to one embodiment of the present invention.

FIG. 4 is a flowchart of an exemplary computer based process 40 for some operations of an interactive device configuration editor, according to one embodiment of the present invention. Process 40 begins with a step 41 wherein the existing configuration that is installed on a configurable device, such as a router or another network device, is loaded at the interactive device configuration editor. The existing configuration can be loaded by transfer via a transport medium or another interface.

In step 42, the existing configuration is displayed in a GUI window, for instance as a document. In step 43, a user acts upon the existing configuration, for example, by changing text comprising the document. In step 44, the interactive device configuration editor analyzes the user action, for instance within the context of a programmed algorithm.

In step 45, it is determined whether the user action comprises an editing action upon the loaded existing configuration, such as a change to text of the document. If it is determined that the action is an editing one, then in step 46 the interactive configuration editor acts locally, for instance using its own component modules and other features of a host computer.

If it is determined that the action is other than an editorial one, then in step 47 the interactive configuration editor acts with the configurable device to implement the action, for instance by exchanging CLI commands or other code via the transport medium. Process 40 can be complete upon execution of either step 46 or step 47.

Figure 5:
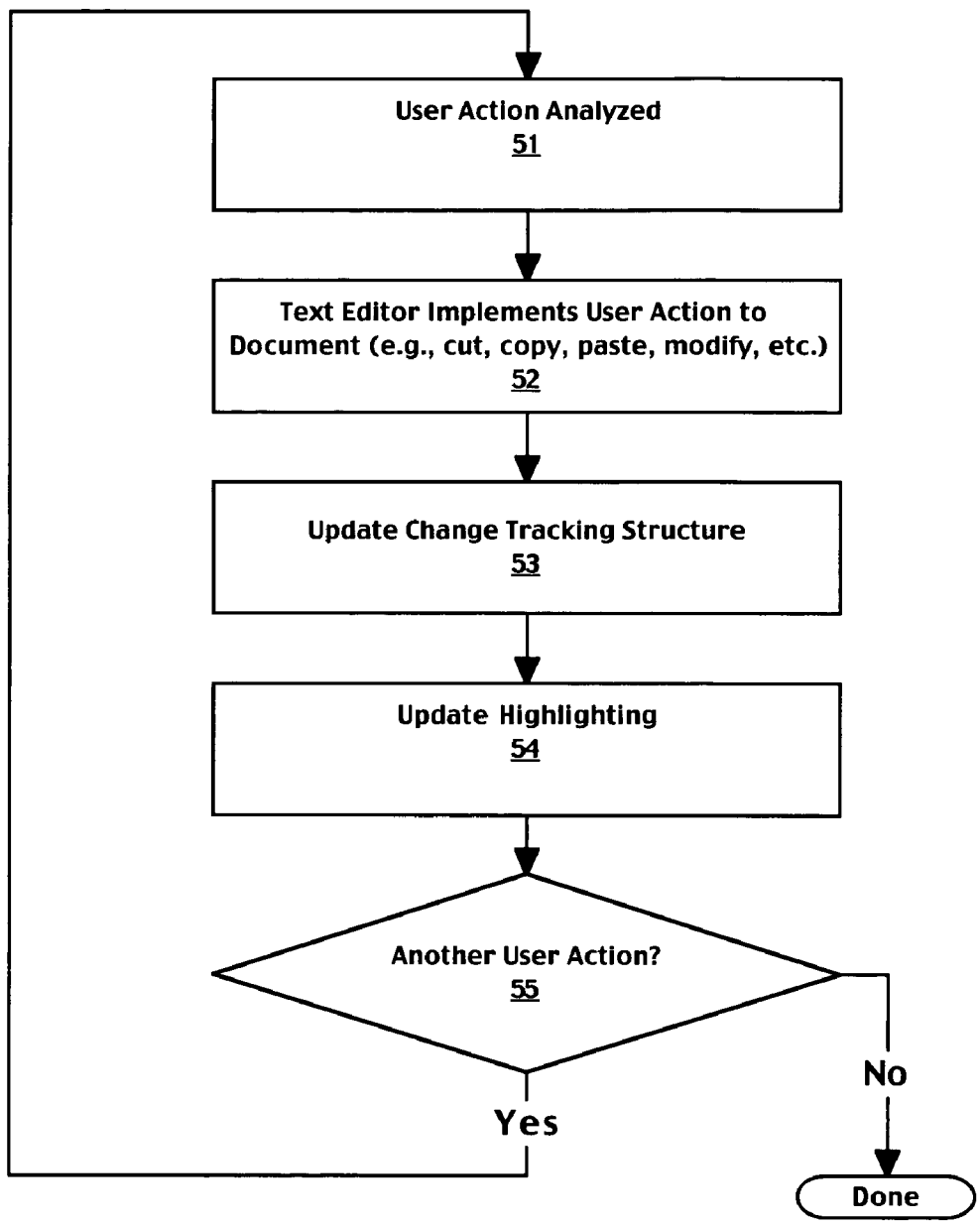
FIG. 5 is a flowchart of an exemplary process for editing actions by an interactive device configuration editor, according to one embodiment of the present invention.

FIG. 5 is a flowchart of an exemplary computer based process 50 for editing actions by an interactive device configuration editor, according to one embodiment of the present invention. Process 50 begins with step 51, wherein a user's editorial action, such as a keyboard entry to a text field of a GUI or to a document, such as a device configuration displayed thereon, or a mouse click upon a menu item or a GUI interactive icon, is analyzed within the context of a programmed algorithm.

In step 52, the interactive configuration editor implements the user action based upon the analysis. For example, a text editor functionality can execute a 'Cut', 'Copy', and/or 'Paste' operation, add, change, or delete text, type characters, or otherwise modify the configuration document corresponding to the user action directing it. In step 53, a change tracking structure is updated regarding the action taken. In step 54, a highlighting module is updated as needed corresponding to the action taken.

In step 55, it is determined whether another user action has been taken. If it is determined that another user action has been taken, process 50 loops back to step 51 and repeats. Process 50 can be complete If it is determined that no other user action has been taken.

Figure 6:
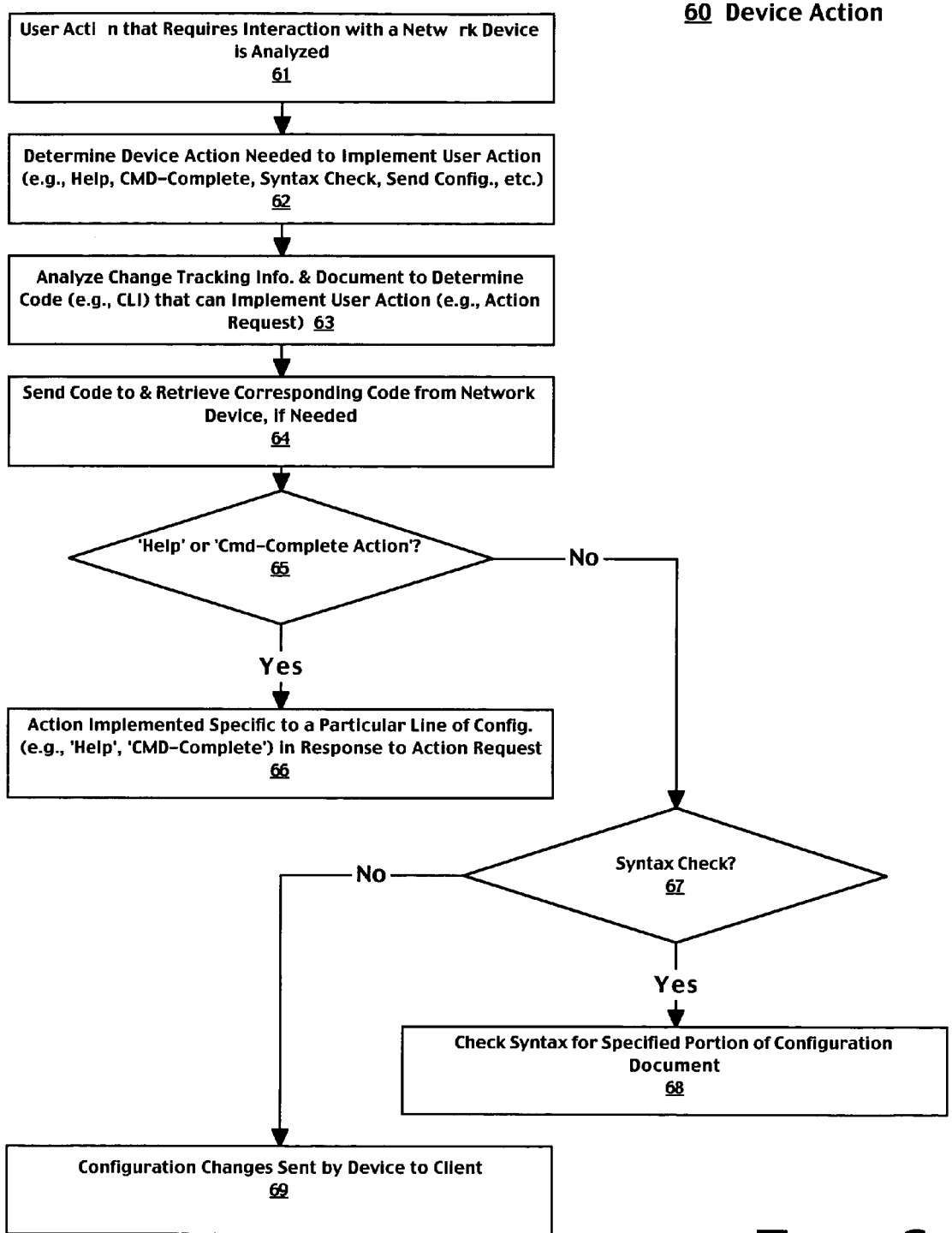
FIG. 6 is a flowchart of an exemplary process for device configuring operations of an interactive device configuration editor, according to one embodiment of the present invention.

FIG. 6 is a flowchart of an exemplary computer based process 60 for device configuring operations of an interactive device configuration editor, according to one embodiment of the present invention. Process 60 begins with step 61, wherein a user action that requires interaction with a network device, is analyzed.

In step 62, an action of the device that can implement the user action is determined. For instance, where a certain user action maps to a CLI command that can be parsed to implement the action (e.g., 'Command-Complete', 'Help', 'Syntax Check', 'Send Config', etc.), the device configuration editor interacts with the configurable device.

The user action of step 61 can thus be treated as an action request. For example, upon typing a few characters that comprise a text fragment of a command and then depressing the 'Tab' key, a command completion function of the device can automatically complete the command. Also for example, upon reaching a point in the text comprising a configuration document where a particular command or set of commands can apply, and then depressing the '?' (e.g., question mark) key, this user action can be treated as a request for a 'Help' function. Responsively, the set of commands that can be applicable are automatically returned by the device for display to (e.g., and selection by) the user.

In step 63, change tracking information and the document are analyzed so as to determine the code that can implement the action (e.g., a CLI command, commands, or other code). In step 64, the corresponding code is sent to the device and the response is retrieved (e.g., from the device). In step 65, it is determined whether the action taken is one that is specifically applicable to a particular line of code comprising the configuration, such as requesting a 'Command-Complete' or a 'Help' function. If so, then in step 66, the requested action is implemented.

If it is determined that the action is not specific to a particular line of the configuration, then in step 67, it is determined whether the action taken requests a syntax check (e.g., expressly or implicitly, such as by sending an entire configuration to a configurable device). If so, then in step 68, the syntax check is run on the configuration document or any selected portion thereof.

If not, then in step 69, the minimum CLI required to implement the changes to the configuration document is sent to the configurable device, for instance, as if it is inferred that sending the configuration changes is the desired action implementation. Process 60 can be complete upon executing step 66, 68, or 69.

Figure 7:
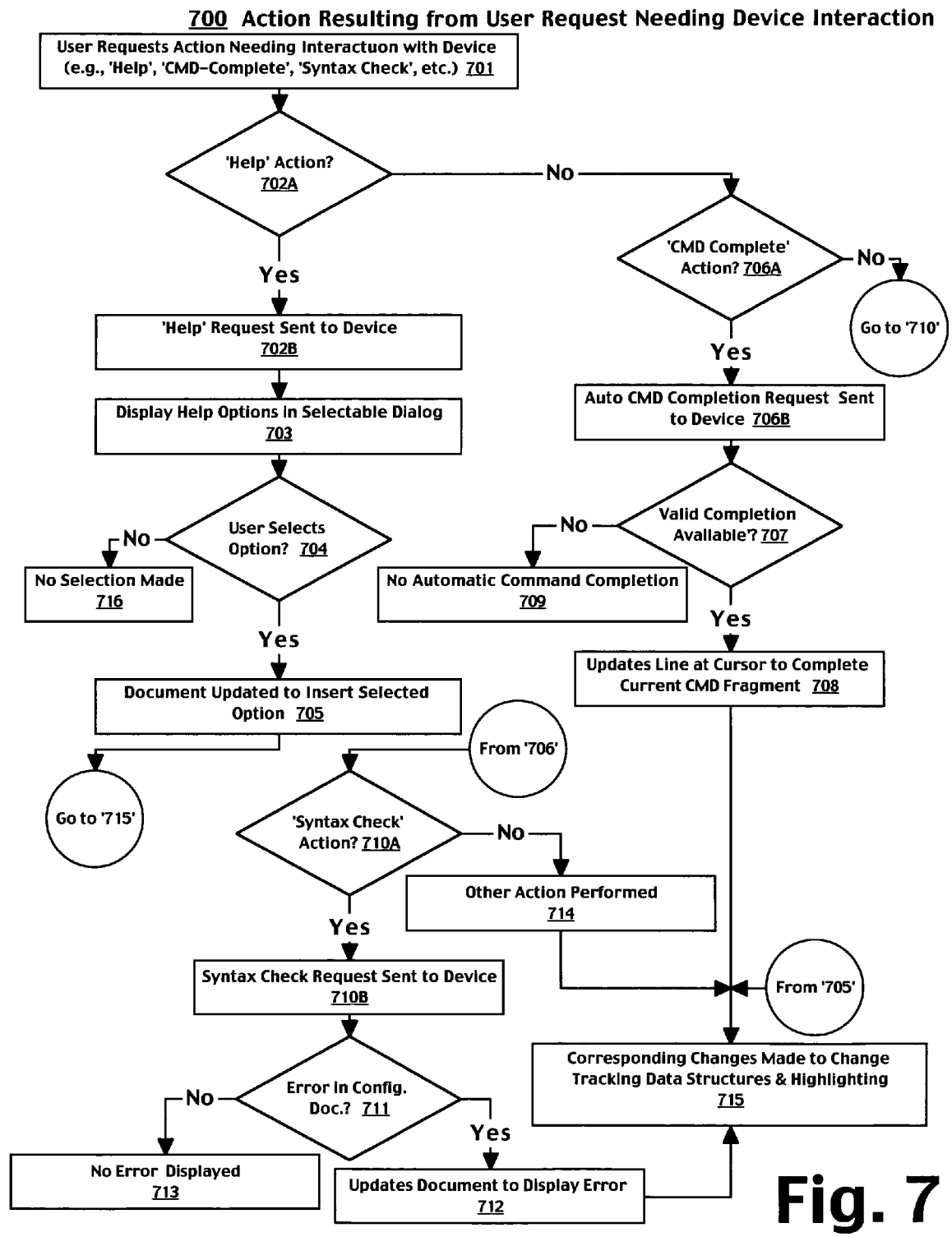
FIG. 7 is a flowchart of an exemplary process for configuring operations of an interactive device configuration editor involving interaction with the network device, according to one embodiment of the present invention.

FIG. 7 is a flowchart of an exemplary computer based process 700 for configuring operations of an interactive device configuration editor specific to particular configuration lines, according to one embodiment of the present invention. Process 700 begins with step 701, wherein a user requests a CLI feature based function that requires interaction with the network device.

In step 702A, it is determined whether the action desired is a 'Help' function. If not, process 700 can proceed to step 706, discussed below. If a 'Help' function is desired, then in step 702B, the configuration editor sends a 'Help' request. In step 703, a GUI displays help options returned responsively to the user request, such as a list of tokens that are valid at that location of the CLI command appropriate to that line of text, in selectable dialog.

In step 704, it is determined whether the user selects one of the options. If not, process 700 loops back to step 703. Where the user selects one of the options, the configuration document is updated to insert the selected option, for instance, at a current cursor position. In step 706A, it is determined whether the action desired is an automatic 'Command (CMD)-Completion' function. If not, process 700 can proceed to step 710, discussed below.

If the user desires an automatic 'Command-completion' function, then in step 706B, the configuration editor sends a request for an automatic command completion. In step 707, it is determined responsively whether a valid completion is available for the command text fragment or otherwise incomplete command. Where a valid command completion exists, in step 708, the line of configuration document text is automatically updated at the cursor to complete the current command fragment. If no valid command completion is available for the fragmentary command, in block 709, no automatic command completion occurs at this point.

In step 710A, it is determined whether a 'Syntax check' function, applicable to a particular line or highlighted portion of text comprising a configuration document (such as to check the syntax of a particular CLI command in the specific context of that text line or highlighted portion) is desired. If not, in step 714, another action may optionally be performed.

If a syntax check function is desired, then in step 710B, the configuration editor sends a request to perform a syntax check. In step 711 it is responsively determined whether an error exists in the configuration document. If not, in block 713, no error is displayed. If an error is found, in step 712 the configuration document is updated so as to display the error to the user, so as to allow it to be corrected.

Upon completing steps 705, 712, or 714, process 700 can proceed to step 715, wherein corresponding changes are made to change tracking data structures and to highlighting. Upon execution of step 715, process 700 can be completed.

Figure 8:
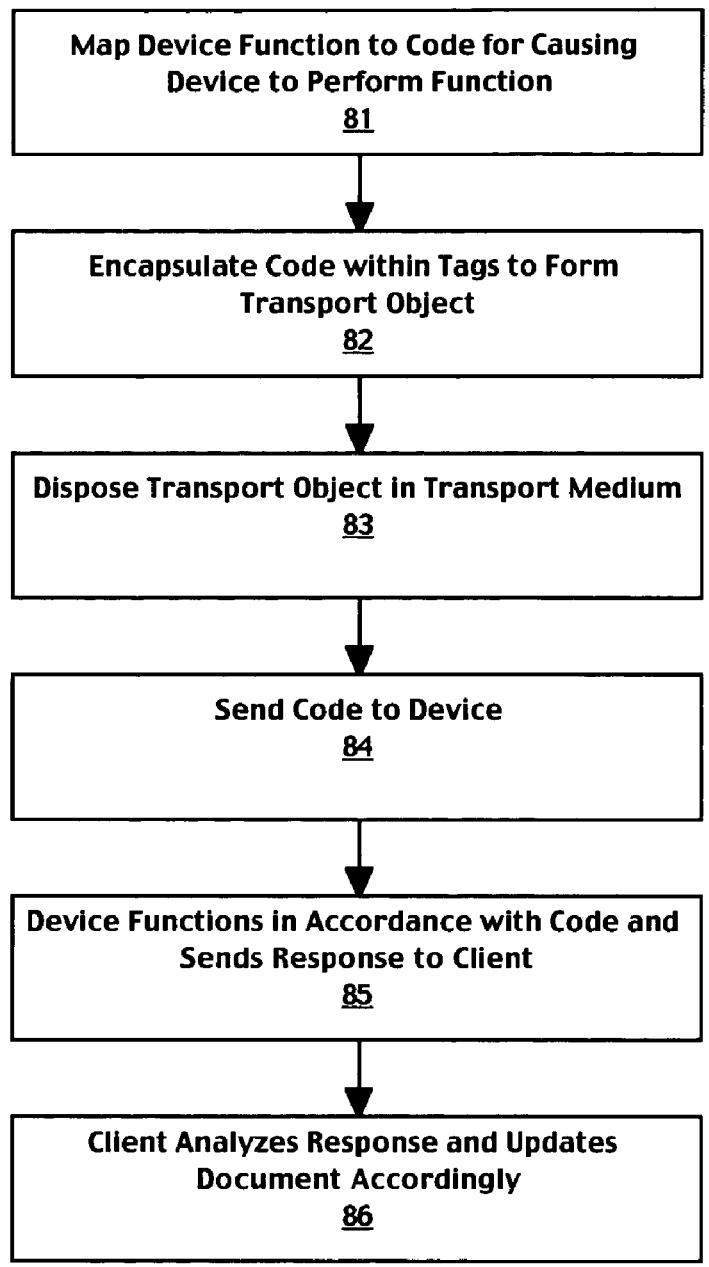
FIG. 8 is a flowchart of a computer based process for configuring a device, according to one embodiment of the present invention.

FIG. 8 is a flowchart of a computer based process 80 for configuring a device, according to one embodiment of the present invention. Process 80 begins with step 81, wherein a function of the device is mapped to code for causing the device to perform the function.

In step 82, the code is encapsulated within tags to form a transport object. In step 83, the transport object is disposed in a transport medium. In step 84, the code is sent to the device. In step 85, the device performs the function in accordance with the code. In step 86, the client computer analyzes the response and updates the configuration document according to that response, completing process 80.

Figure 9:
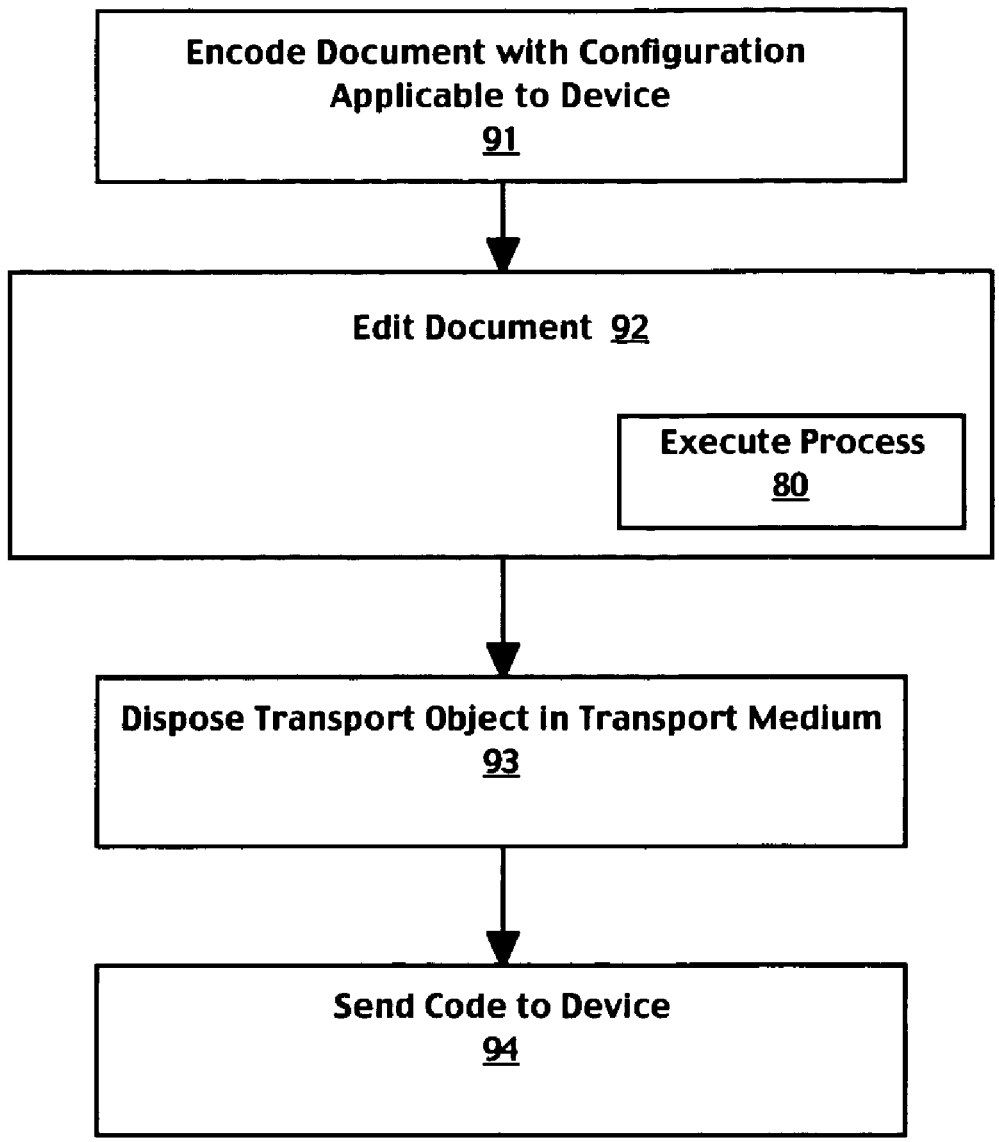
FIG. 9 is a flowchart of a computer based process for configuring a device, according to one embodiment of the present invention.

FIG. 9 is a flowchart of a computer based process 90 for configuring a device, according to one embodiment of the present invention. Process 90 begins with step 91, wherein a document is encoded with a configuration applicable to the device.

In step 92, the document is edited. In one embodiment, Process 80 can be performed during or as a part of executing step 92. In step 93, the configuration is sent to the device. In step 94, the configuration is applied to the device, completing process 90.

Figure 10:
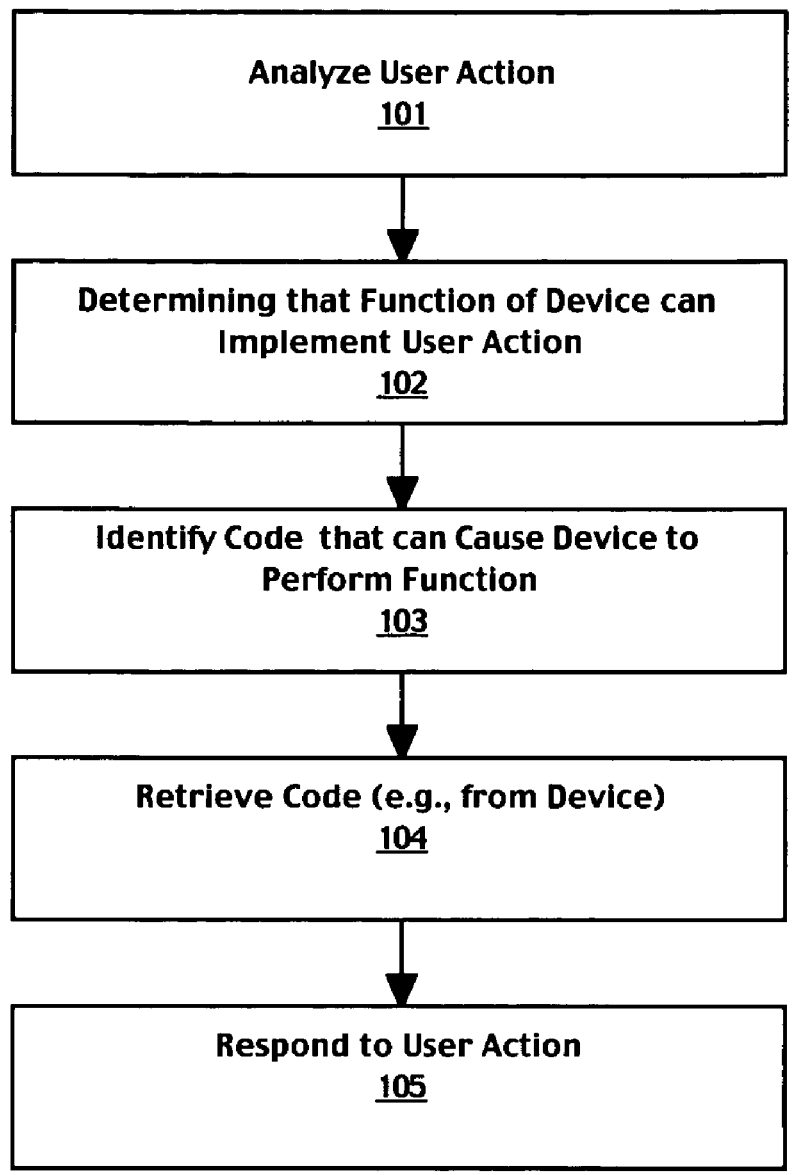
FIG. 10 is a flowchart of a computer based process for configuring a device, according to one embodiment of the present invention.

FIG. 10 is a flowchart of a computer based process 100 for configuring a device, according to one embodiment of the present invention. Process 100 begins with step 101, wherein a user action is analyzed.

In step 102, it is determined that a function of the device can implement the user action. In step 103, code is identified that can cause the device to perform the function.

In step 104, the code is retrieved, for instance, from the device. In step 105, the device functions to respond to the user action, completing process 100.

Figure 11:
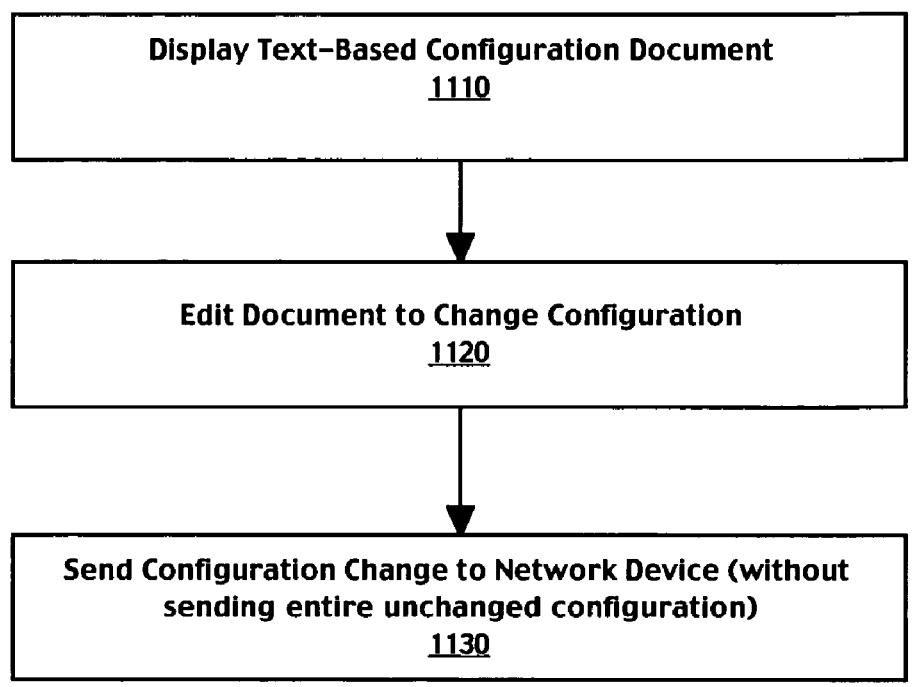
FIG. 11 is a flowchart of a computer based process for configuring a device, according to one embodiment of the present invention.

FIG. 11 is a flowchart of a computer based process 1100 for interactively configuring a device, according to one embodiment of the present invention. Process 1100 begins with step 1110, wherein a document is displayed to a user of a client computer. The document can be displayed in response to a user request. The document displayed comprises a configuration for the network device in a text format. The configuration can be retrieved from the network device. Alternatively, the document can be written by the user "from scratch" at the client computer, or using another configuration as a base and changed. The configuration can also be retrieved from a network device different from the network device to be configured.

In step 1120, the document is edited or otherwise changed, in order to change the configuration. In step 1130, the configuration change is sent to the network device, completing process 1100. Advantageously, the change is sent without sending the entire configuration (e.g., the unchanged portions as well as the changes), thus conserving networking and computing resources. Further, the present embodiment can save time and reduce the possibility of error introduction, in comparison with conventional device configuration approaches.

Where an entire configuration is to be changed (e.g., replaced in its entirety with a different configuration) or a substantial portion thereof, one embodiment allows an entire configuration to be sent from the client computer to the network device. However, where only a part of a configuration changes, only the code comprising the change is sent to the network device.

The editing of the document can comprise interacting with the network device. In one embodiment, this interaction involves sending a first code component from the client computer to the network device and receiving a second code component from the network device at the client computer in response to sending the first code component.

The interaction with the network device can involve, for instance, an automatic completion of a command entered by the user into the text. The first code component for this interaction comprises a textual fragment of a command, wherein said second code component comprises said command in its entirety. The second code component, e.g., the command in its entirety, is added to the text at the point at which the command fragment was inserted.

The interaction with the network device can also involve, for instance, automatically displaying a list of commands that are appropriate to a position in the text. Here, the first code component requests this list and the second code component includes the list. The list is displayed to the user, who can then select a command from the list for insertion into said text at said position.

The interaction with the network device can also involve, for instance, performing a syntax check. Here, the first code component initiates the syntax check (e.g., by request). The second code component comprises reporting of the detection of an error in the configuration by the network device. The document is then updated to display that error (which can comprise multiple errors) to the user.

Sending the change in the configuration comprises sending the change in the configuration without sending an unchanged component of the configuration to said network device. The change in the configuration is sent, in one embodiment, by forming a transport object containing code comprising the change and disposing that transport object within a transport medium. The code can comprise a command, which can be rendered in Command Line Interface (CLI) format. In one embodiment, the transport medium comprises a serial line interface. In one embodiment, the transport medium comprises Telnet. In yet another embodiment, the transport medium comprises Secure Shell (SSh).

Embodiments of the present invention are well suited to operate with a variety of transport media. In one embodiment, the transport medium comprises an interface and wherein said interface substantially complies with Common Object Request Broker Architecture (CORBA). In one such embodiment, the transport object can be formed by embedding the code for the changes, for instance in a CLI format, within a set of tags such as XML markers.

In summary, a method and system for interactively configuring a network device is disclosed. A computer based method interactively configures a network device such as a router. A document is displayed a to a user of a client computer, which is coupled to the network device via a network. The document contains a configuration for the network device in a text format. The user edits the document to make a change in the configuration of the network device. The change in the configuration is sent to the network device. The change can be sent without sending the entire configuration.

An embodiment of the present invention, a method and system for interactively configuring a network device, is thus described. While the present invention has been described in particular embodiments, it should be appreciated that the present invention should not be construed as limited by such embodiments, but rather construed according to the following claims and their equivalents.

What is claimed is:

1. A system comprising:
    a computer communicatively coupled to a network device over a network, said computer operable to:
    display a document including text, where said text is editable and corresponds to a local copy of a configuration file for said network device, said text representing a plurality of objects, wherein said objects are different from one another and each control different functionality of said network device;
    receive a user input modifying a selected portion of said text that corresponds to one of said objects;
    send a first code component to said network device;
    receive a second code component from said network device in response to said sending said first code component;
    initiate an automatic completion of a user inputted command, wherein said first code component comprises a textual fragment of said user inputted command, wherein said second code component comprises a completed command in its entirety, and wherein said completed command in its entirety is added to said text;
    wherein said document is retrieved from said network device in response to a user request or written by a user; and
    exchange communications with said network device prior to receiving a subsequent user input that modifies a different portion of said text that corresponds to a different one of said objects, said communications for:
        dynamically modifying a remote copy of said configuration file that is stored on said network device without exchanging an entire copy of said configuration file between said computer and said network device; and
        generating incremental configuration changes in said network device.

2. The system of claim 1 wherein said network device is reconfigured dynamically and interactively while said user modifies said text displayed by said computer.

3. The system of claim 1 further comprising:
    said network device to send said completed command to said computer for synchronizing changes to said local copy of said configuration file with changes to said remote copy of said configuration file; and
    said computer to receive said completed command and update said displayed document based on said completed command.

4. The system of claim 3 wherein said document displays said textual fragment when said network device initiates reconfiguration based on said complete command.

5. The system of claim 1 wherein said network device is configured to perform syntax checking on edited lines transferred from said computer responsive to said communication exchange.

6. The system of claim 1 wherein said computer is operable to use a Command Line Interface (CLI) parser installed on said network device to process said user request.

7. The system of claim 6 wherein the computer does not emulate a replication of said Command Line Interface (CLI) parser of said network device.

8. The system of claim 7 wherein said computer leverages a command correction capability of said network device so that changes to a first command-set used for command correction on said network device do not require an update to a second command-set on said computer.

9. The system of claim 1 wherein said computer is further operable to send said selected portion of said text to said network device without sending different unchanged portions of said text.

10. The system of claim 1 further comprising:
    said computer to form a transport object;
    said computer to generate code indicating said modifications to said selected portion of said text; and
    said computer to dispose said transport object containing said code within a transport medium.

11. The system of claim 10 wherein said code comprises a command configured to instruct said network device to make corresponding modifications to said remote copy of said configuration file.

12. The system of claim 11 wherein said command configured to instruct said network device to make corresponding modifications to said remote copy of said configuration file is rendered in Command Line Interface format.

13. The system of claim 10 wherein said transport medium comprises an interface and wherein said interface substantially complies with Common Object Request Broker Architecture.

14. The system of claim 13 wherein said computer is configured to form said transport object by embedding said code within a set of tags and wherein said tags comprise Extensible Markup Language markers.

15. The system of claim 10 wherein said transport medium comprises a serial line interface.

16. The system of claim 10 wherein said transport medium comprises Telnet.

17. The system of claim 10 wherein said transport medium comprises Secure Shell.

18. A computer readable storage medium storing a program having instructions, the instructions when executed by a processor to cause a computer to:
provide a development environment application;
change a document using a text editing tool co-functional with said development environment application, wherein said document comprises a configuration for a network device and wherein said configuration is retrieved from said network device in response to a user request;
display said document on a user interface co-functional with said development environment application and allow a user to make said change to said document via said user interface;
generate code corresponding to said change via a code generator co-functional with said user interface; and
send said change to said network device via a communication module co-functional with said code generator, wherein said communication module is operable to:
send a first code component from said communication module to said network device; and
receive a second code component from said network device at said communication module in response to said first code component; and
wherein said user request comprises at least one request selected from the group comprising:
initiate an automatic completion of a command entered by said user into said document, wherein said first code component comprises a textual fragment of said command, wherein said second code component comprises said command in its entirety, and wherein said command in its entirety is added to said document;
request a list of commands that are appropriate to a position in said document, wherein said first code component requests said list, wherein said second code component comprises said list, wherein said list is displayed to said user, and wherein said user may select a command from said list for insertion into said document at said position; and
initiate a syntax check, wherein said first code component comprises a request for said syntax check, wherein said second code component comprises a detection of an error in said document, and wherein said document is updated to display said error.

19. The computer readable storage medium system as recited in claim 18 wherein said change in said configuration is sent without sending an unchanged component of said configuration to said network device and wherein said communication module is further operable to:
form a transport object wherein said transport object contains code comprising said change; and
dispose said transport object within a transport medium wherein said transport medium comprises an interface, wherein said interface complies with Common Object Request Broker Architecture, and wherein said transport medium is selected from the group comprising;
a serial line interface;
Telnet; and
Secure Shell.

20. The computer readable storage medium as recited in claim 19 wherein the instructions when executed by a processor, further cause a computer to;
highlight a part of said document to implement said change using a highlighting module to indicate which parts of said document have been modified; and
restore said configuration to a state prior to implementing said change using an undo manager.

21. A method comprising:
displaying a document including text corresponding to a configuration file stored on a remotely located network device, said text representing multiple different objects that each control different operational characteristics of said remotely located network device;
receiving a user input modifying a selected portion of said text that corresponds to a first subset of said objects;
sending one or more communications over a network to said network device prior to receiving a subsequent user input that modifies a different portion of said text that corresponds to a second different subset of said objects, said communications configured to cause said network device to dynamically modify said configuration file that is stored on said network device;
sending a first code component to said network device;
receiving a second code component from said network device in response to said sending said first code component;
initiating an automatic completion of a user inputted command, wherein said first code component comprises a textual fragment of said user inputted command, wherein said second code component comprises said command in its entirety, and wherein said command in its entirety is added to said text; and
after performing command completion responsive to receiving said second code component, updating a display of said textual fragment with said command in its entirety to synchronize said display with said configuration file located on said network device.

22. The method of claim 21 wherein said communications include payload data configured to control only a subset of said operational characteristics that corresponds to said first subset of said objects such that said method does not require transferring an entire copy of said configuration file to or from said network device to elicit said dynamic modification of said configuration file.

23. The method of claim 21 further comprising:
forming a transport object for sending said communications, wherein said transport object contains code configured to control said dynamic modification of said configuration file; and
disposing said transport object within a transport medium.

24. The method of claim 23 wherein said code comprises a command and wherein said command is rendered in Command Line Interface format.

25. The method of claim 23 wherein said transport medium comprises a medium selected from the group consisting of:
a medium comprising an interface wherein said interface substantially complies with Common Object Request Broker Architecture;
a serial line interface;
Telnet; and
Secure Shell.

26. An apparatus, comprising:
means for displaying a document including text to a local user upon receiving a configuration of a remote network device, wherein said document comprises said configuration for said remote network device in a text format and wherein said apparatus is coupled to said remote network device;

means for allowing said user to modify said text comprising said document;

means for interacting with said remote network device to provide said modified text to said remote network device, wherein said interacting means comprises;

means for sending a first code component comprising at least a portion of said modified text to said remote network device;

means for receiving a second code component from said remote network device in response to said sending said first code component;

means for initiating an automatic completion of a user inputted command, wherein said first code component comprises a textual fragment of said user inputted command, wherein said second code component comprises said command in its entirety, and wherein said command in its entirety is added to said text; and means for updating a display of said textual fragment with said command in its entirety to synchronize said display with a configuration file located on said remote network device after performing command completion responsive to receiving said second code component.

27. The apparatus as recited in claim 26 wherein said modified text includes a syntax error and wherein said second code component comprises said portion of said modified text with said syntax error corrected.

28. The apparatus as recited in claim 27 further comprising:

means for forming a transport object wherein said transport object contains said first code component; and means for disposing said transport object within a transport medium.

29. The apparatus as recited in claim 28 wherein said apparatus is configured to interact with said remote network device to provide said modified text independently of whether said apparatus detects that said modified text comprises an incomplete command and wherein said transport medium comprises a medium selected from the group consisting of:

a medium comprising an interface and wherein said interface substantially complies with Common Object Request Broker Architecture;

a serial line interface;

Telnet; and

Secure Shell.

30. The system of claim 1 wherein said computer is configured to communicate directly with said network device such that said direct communications are not affected by or exchanged via an intermediary data processing module that generates configuration data in the form of a list or directory and restricts configuration modification to user selections from said list or directory.

31. A system comprising:

a computer communicatively coupled to a network device over a network, the computer operable to:

display a document including editable text corresponding to a local copy of a configuration file for said network device, said editable text representing a plurality of different objects that each control different functionality of said network device;

receive a user input modifying a selected portion of said editable text that corresponds to one of said plurality of different objects wherein said user input represents a textual fragment to be automatically completed by said computer;

send a first code component to said network device, said first code component representing said textual fragment;

receive back a second code component, said second code component comprising a complete command that corresponds to said textual fragment;

exchange communications with said network device prior to receiving a subsequent user input that modifies a different portion of said editable text that corresponds to a different one of said plurality of different objects, said communications for:

dynamically modifying a remote copy of said configuration file that is stored on said network device without exchanging an entire copy of said configuration file between said computer and said network device; and generating incremental configuration changes in said network device; and updating said displayed document to include said complete command.

32. A system comprising:

a computer communicatively coupled to a network device over a network, the computer operable to:

display a document including editable text corresponding to a local copy of a configuration file for said network device, said editable text representing a plurality of different objects that each control different functionality of said network device;

receive a user input modifying a selected portion of said editable text that corresponds to one of said plurality of different objects, wherein said user input selects a position within said editable text;

exchange communications with said network device prior to receiving a subsequent user input that modifies a different portion of said editable text that corresponds to a different one of said plurality of different objects, said communications to:

dynamically modify a remote copy of said configuration file that is stored on said network device without exchanging an entire copy of said configuration file between said computer and said network device; and generate incremental configuration changes in said network device;

send a first code component requesting a list of commands that are appropriate to said user selected position within said editable text;

receive back a second code component representing said list of commands;

display said list of commands for user selection;

responsive to receiving a user selection from said list, insert a corresponding one of said commands from said list into said editable text at said position; and initiate an automatic completion of a user inputted command, wherein said first code component comprises a textual fragment of said user inputted command, wherein said second code component comprises said completed command in its entirety, and wherein said completed command in its entirety is added to said editable text.

33. A system comprising:

a computer communicatively coupled to a network device over a network, the computer operable to:

display a document including editable text corresponding to a local copy of a configuration file for said network device, said editable text representing a plurality of different objects that each control different functionality of said network device;

receive a user input modifying a selected portion of said editable text that corresponds to one of said plurality of different objects;

initiate an automatic completion of a user inputted command, wherein said user inputted command is incomplete and wherein a completed command in its entirety is added to said editable text;

exchange communications with said network device prior to receiving a subsequent user input that modifies a different portion of said editable text that corresponds to a different one of said plurality of different objects, said communications to:

dynamically modify a remote copy of said configuration file that is stored on said network device without exchanging an entire copy of said configuration file between said computer and said network device; and generate incremental configuration changes in said network device;

send a first code component to said network device responsive to a user modifying said editable text, said first code component requesting a syntax check by said network device on said modified text; and receive back a second code component indicating a syntax error in said modified text; and display said syntax error.

34. An apparatus comprising:

one or more processors; and a memory coupled to the processors comprising instructions executable by the processors, the processors operable when executing the instructions to:

display an editable document representing a local copy of a configuration file stored on a remote network device, said editable document representing a plurality of different objects that each control different functionality of said remote network device;

detect an input modifying said editable document;

responsive to detecting said input, send a first code component representing a command fragment over a network and to said remote network device;

receive back a second code component over said network and from said remote network device, said second code component including a command corresponding to said command fragment;

initiate an automatic completion of an input modifying said editable document, said automatic completion to update a display of said command fragment with said command in its entirety to synchronize said displayed editable document with said reconfigured configuration file located on said remote network device; and exchange communications with said network device prior to receiving a subsequent input modifying a different portion of said editable document that corresponds to a different one of said plurality of different objects, said communications for:

dynamically modifying a remote copy of said configuration file that is stored on said remote network device without exchanging an entire copy of said configuration file between said computer and said network device; and generating incremental configuration changes in said network device.

35. The apparatus of claim 34, wherein said second code component includes an indication that said configuration file stored on said remote network device has been modified according to said corresponding command; and wherein said modification of said configuration file stored on said remote network device occurs before said second code component is received and before said editable document is updated with said command in its entirety.

36. The apparatus of claim 34 wherein said first code component comprises a textual fragment of a predetermined textual modification and said second code component comprises said textual modification in its entirety, and wherein said textual modification is added to said editable document.

37. The apparatus of claim 34 wherein the processors are further operable when executing the instructions to:

modify said configuration file stored on said remote device incrementally by repeating iterations of:

detecting an input modifying said editable document;

responsive to detecting said input, sending an nth code component to said remote network device;

receiving back an (n+1)th code component over said network and from said remote network device, said (n+1)th code component responsive to said nth code component; and updating a display of said editable document to reflect said remote network device response.

38. The apparatus of claim 37 wherein said nth code component represents at least a request for a list of commands that correlate to an indicated position within said editable document and wherein said (n+1)th code component represents at least said list of commands.

39. The apparatus of claim 37 wherein said nth code component represents at least a request for a syntax check of said modified editable document and wherein said (n+1)th code component represents at least an indication of a syntax error in said modified editable document.

* * * * *

UNITED STATES PATENT AND TRADEMARK OFFICE
CERTIFICATE OF CORRECTION

PATENT NO.        : 7,509,400 B1
APPLICATION NO.   : 10/723120
DATED             : March 24, 2009
INVENTOR(S)       : Tanner et al.

Page 1 of 1

It is certified that error appears in the above-identified patent and that said Letters Patent is hereby corrected as shown below:

Title Pg, Item (73) Assignee, please replace "Cisco Technology inc." with --Cisco Technology, Inc.--.
Title Pg, Item (57) Abstract, line 4, please replace "displayed a to a user" with --displayed to a user--.
At column 16, line 33, please replace "wherein the computer" with --wherein said computer--.
At column 18, line 3, please replace "a computer to;" with --a computer to:--.
At column 20, line 21, please indent the section beginning with "updating".

Signed and Sealed this

Nineteenth Day of May, 2009

JOHN DOLL
*Acting Director of the United States Patent and Trademark Office*